Figure 1:
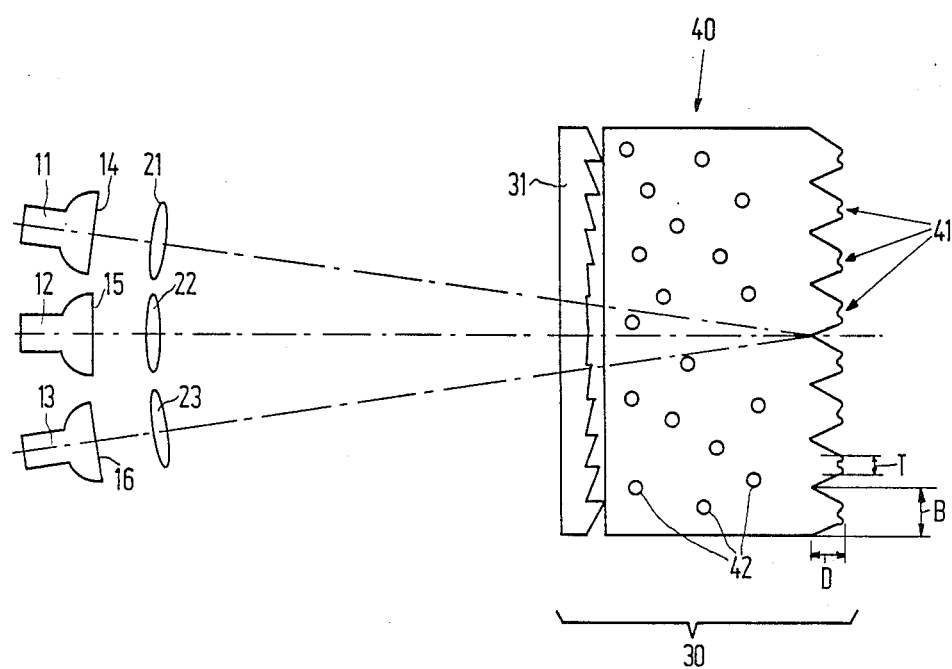

United States Patent [19]

Gerritsen et al.

[11] Patent Number: 4,762,393
[45] Date of Patent: Aug. 9, 1988

[54] REAR PROJECTION SCREEN AND REAR PROJECTION SYSTEM PROVIDED WITH SUCH A SCREEN

[75] Inventors: Gerrit B. Gerritsen; Leendert Vriens; Johannes C. van de Ven, all of Eindhoven, Netherlands

[73] Assignee: U.S. Philips Corporation, New York, N.Y.

[21] Appl. No.: 36,419

[22] Filed: Apr. 9, 1987

[30] Foreign Application Priority Data

Jan. 21, 1987 [NL] Netherlands .......................... 8700135

[51] Int. Cl.$^4$ .............................................. G03B 21/60
[52] U.S. Cl. ..................................................... 350/128
[58] Field of Search ................................ 350/126, 128

[56] References Cited

U.S. PATENT DOCUMENTS

| | | | |
|---|---|---|---|
| 2,480,031 | 8/1949 | Kellogg | 350/128 |
| 3,830,556 | 8/1974 | Bratkowski | 350/128 |
| 4,374,609 | 2/1983 | Lange | 350/128 |
| 4,469,402 | 9/1984 | Yata et al. | 350/128 |
| 4,536,056 | 8/1985 | Oguino | 350/128 |
| 4,548,469 | 10/1985 | Inoue et al. | 350/128 |
| 4,561,720 | 12/1985 | Clausen et al. | 350/128 |
| 4,573,764 | 3/1986 | Bradley | 350/128 |
| 4,674,836 | 6/1987 | Yata et al. | 350/128 |
| 4,679,900 | 7/1987 | McKechnie et al. | 350/128 X |

*Primary Examiner*—Richard A. Wintercorn
*Attorney, Agent, or Firm*—Thomas A. Briody; Algy Tamoshunas; Marianne R. Rich

[57] ABSTRACT

The vertical viewing angle of a rear projection screen having a large horizontal viewing angle and good color correction due to the special shape of the light dispersing elements provided on the front side of the plate is increased by elements provided on the rear side and extending in a direction perpendicular to the front side elements. The latter are preferably total internal reflection elements, while the former are not. A bulk diffusor may be largely or completely dispensed with.

13 Claims, 3 Drawing Sheets

REAR PROJECTION SCREEN AND REAR PROJECTION SYSTEM PROVIDED WITH SUCH A SCREEN

The invention relates to a rear projection screen having a front and a rear side for displaying on the front side of the screen an image supplied by at least one primary image source placed on the rear side of the screen, said screen comprising a light-transparent plate having on its front side a multiple of parallel-arranged first light-spreading elements extending in a first direction across the plate for spreading light in a first plane perpendicular to the first direction, said elements having steep edges for obtaining total internal reflection and a tip having a curved flatter portion for transmission and refraction. The invention also relates to a rear projection system provided with such a rear projection screen.

Rear projection screens are used in various types of display systems such as radar screens, flight and ship simulators, microfilm readers and rear projection systems for video and cinematographic pictures. In such display systems an image is generated in a primary image source and is imaged on the rear projection screen by a system of projection lenses. The projection screen spreads the light incident from the rear into the audience space in front of the screen.

Projection systems for the display of colour video programmes comprise three primary image sources for red, green and blue, respectively, which are projected onto the screen by separate systems of projection lenses. The light intensity of each image source is maximum on the optical axis of the relevant image source and the associated system of projection lenses. Since the three image sources are placed side by side or above one another, the said axes extend at angles at the area of the projection screen so that without any further steps, the viewer observes a color shift dependent on his position in the audience space.

A rear projection screen in which this color shift is reduced to a minumum in the horizontal direction of this space is described in European Patent Application No. 0,148,529 corresponding to U.S. Pat. No. 4,573,764. This is achieved by providing light spreading elements with a height-to-width ratio of at least 1:1 extending in the vertical direction, whose tip has a width of at most half the width at the base and in which the tip has a specially shaped indentation. The height of the element is herein to be understood to mean the maximum relief perpendicular to the plane of the screen. Light-absorbing material can be provided in the deep grooves between the elements so that reflection of ambient light is inhibited by the screen and the contrast in the displayed image is increased. The light from the primary image source, and incident on the rear side of the screen, is guided to the tips of the profile due to total internal reflection on the steep edges so that there is a high transmission for this light. Due to the combination of steep edges and curved flatter tips a wide angular distribution in the horizontal direction is also achieved.

The elements extending in the vertical direction spread the light entering via the rear side in a horizontal direction in a region extending over approximately 85° to the left and right. In the vertical direction the light-spreading elements do not have any appreciable effect, so that other steps are to be taken for spreading light in that direction.

It has been proposed in the above-cited European Patent Application No. 0,148,529 to give the plate light-dispersing properties, for example by roughening the rear side of the plate or by incorporating a light-dispersing material in the plate. The Article "Ultra-wide viewing angle rear projection screen" by R. Bradley et al., published in the magazine "IEEE Transactions on consumer electronics", Vol. CE-31, No. 3, pages 185–192 (1985) states the possibility of providing a so-called "bulk diffusor" in the plate, which diffusor consists of grains having a different refractive index. It stands to reason that in addition to the desired vertical light spread these steps also have a light-spreading effect in the horizontal direction.

The said steps to spread the light in the vertical direction have two drawbacks. In the first place they limit the resolving power of the screen because the imaging beams traverse, as it were, a "misty" screen and are therefore no longer imaged sharply on the front side of the screen viewed by the audience. In the second place this misty, approximately Gaussian light spread results in a considerable portion of the light falling outside the audience space. This is of course at the expense of the light intensity within the audience room.

The invention has for its object to obviate these drawbacks.

To this end a rear projection screen according to the invention is characterized in that the rear side of the plate has parallel-arranged second light-spreading elements extending in a second direction substantially perpendicular to the first direction for spreading light in a second plane perpendicular to the second direction. As a result a vertical light spread is obtained so that the screen mass itself does not need to have any, or a considerably less dispersing effect. The horizontal spread is substantially only determined by the elements on the front side. Since there is no longer any, or considerably less light dispersion required in the screen, the picture is projected sharply. The shape of the light-spreading elements on the rear side may be adapted to the intensity distribution in the vertical direction desired for a given field of application. It stands to reason that the invention can also be used for a tip which has a different shape than that described in the said European Patent Application No. 0,148,529.

The rear projection screen according to the invention is preferably characterized in that light, which is substantially perpendicularly incident on the rear side of the screen, is refracted through an angle of between 5° and 20° at a maximum by the second light-spreading elements, in co-operation with the first light-spreading elements which are not curved in the vertical direction. The full vertical dimension of the audience room is then approximately 10° to approximately 40°. The desired value is dependent on the field of application. When using the screen in a video monitor or a projection television set for use in the home, a total vertical viewing angle of approximately 22° is optimal.

The rear projection screen according to the invention may also be characterized in that the maximum angle between the surface of the second light-spreading elements and the plane of the plate has a value of between approximately 10° and approximately 40°. The commonly used materials for a projection screen, such as polymethylmethacrylate (PMMA), have a refractive index n of approximately 1.5. The said geometrical angles of approximately 10° and approximately 40° result in the above-mentioned approximately vertical viewing angles at this value of n.

A first embodiment of the rear projection screen according to the invention is characterized in that the second light-spreading elements are convex elements. A further embodiment is, however, characterized in that the second light-spreading elements are concave elements. A third embodiment of the rear projection screen according to the invention is characterized in that a number of the second light-spreading elements is convex and a number is concave. This embodiment may be further characterized in that the convex and concave second light-spreading elements alternate with one another. The choice of a given configuration of convex and/or concave light-spreading elements and the exact shape of the convex and/or concave elements is dependent, inter alia, on the field of application, the desired distribution of the light intensity in vertical directions and the processes used for the manufacture of the screen.

A preferred embodiment of the rear projection screen according to the invention is characterized in that the cross-sections of the second light-spreading elements substantially have the shape of a segment of a circle. This shape results in a substantially rectangular intensity distribution and can be manufactured in a relatively simple manner.

The rear projection screen according to the invention may be further characterized in that a segment of a circle constitutes an arc of approximately 44°. With this arc a full vertical viewing angle of 22° which is very suitable for a projection television system is obtained.

The rear projection screen according to the invention is further characterized in that a diffusor is provided in the plate. By providing a relatively low light-dispersing power in the plate mass, no more than approximately one third of the power required in a screen without light-spreading elements on the rear side, small impurities in the profiles can be equalized and a slightly more gradual variation of the light intensity distribution is obtained, particularly with respect to the first light-spreading elements.

Furthermore the rear projection screen according to the invention may be characterized in that the rear side of the plate is anti-reflective. This reduces both the loss of light from the primary picture source due to reflection on the rear side of the plate, and it reduces reflection of ambient light entering through the front side of the plate. The rear side may be made anti-reflective by providing a conventionally used coating consisting of one or more layers or by providing it with a microrelief structure as described in the magazine "Optica Acta", Vol. 29, No. 7, pages 993–1009 (1982), or by a combination of a roughened surface with a layer of constant thickness provided thereon as described in the European Patent Application No. 0,131,341 laid open to public inspection.

A preferred embodiment of the rear projection screen according to the invention is further characterized in that the number of second light-spreading elements is at least 2000. When using the screen in a rear projection television system, the width of a light-spreading element is smaller than the detail size of the projected image so that there is no loss of resolving power in the screen.

The invention also relates to a rear projection system comprising a primary image source and a system of lenses for projecting the image generated by the primary image source onto a screen, which system is provided with a rear projection screen in accordance with any one of the above-mentioned embodiments. The intensity distribution in the vertical direction and the resolving power of such a rear projection system are better than in a system having the known rear projection screen.

Figure 2:
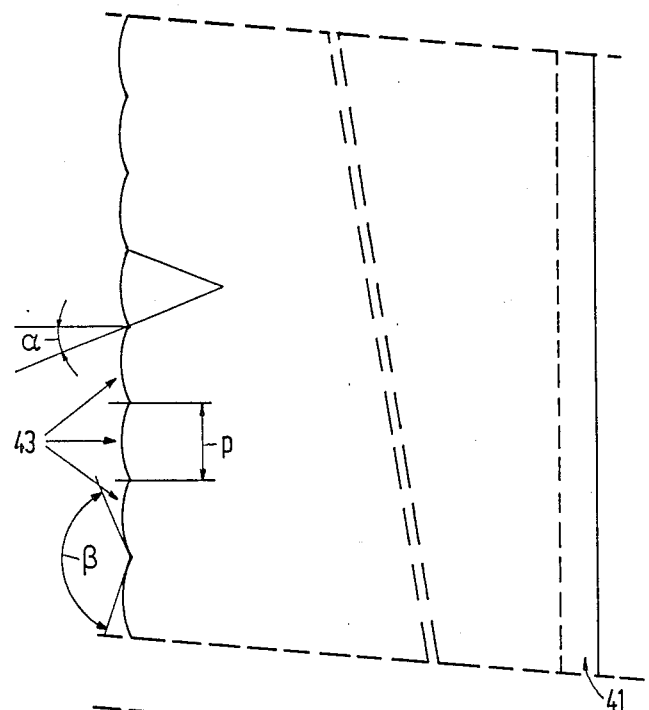
Figure 3:
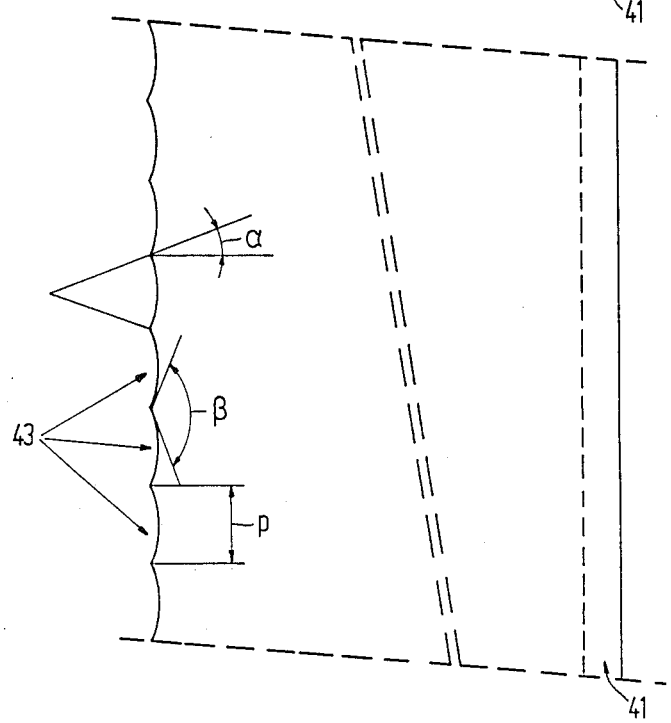
Figure 4:
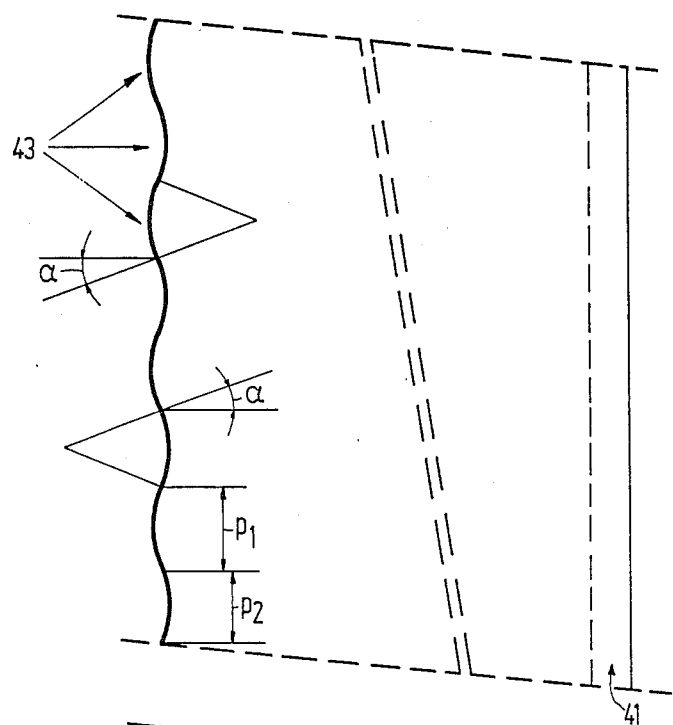
Figure 5:
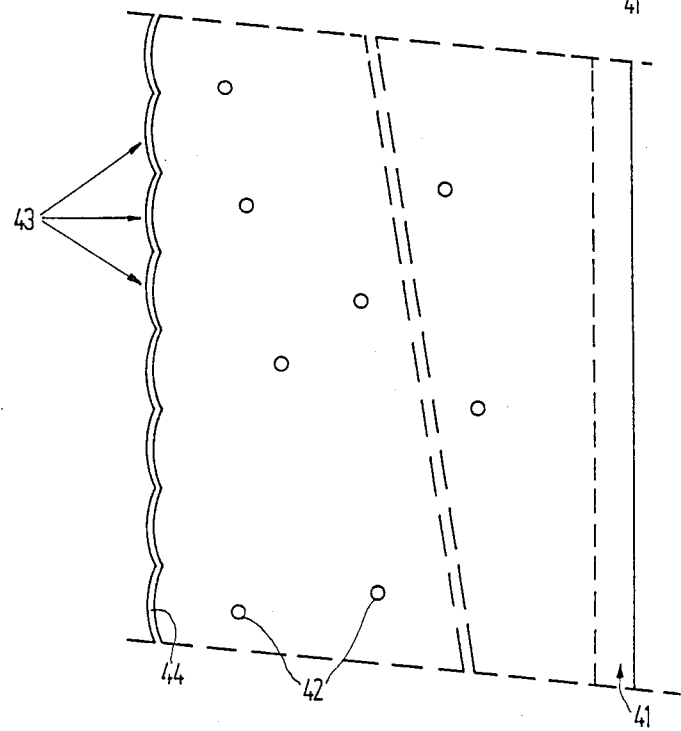

The invention will now be described in greater detail with reference to the accompanying drawings in which FIG. 1 shows diagrammatically a rear projection system having a known rear projection screen, FIG. 2 is a cross-section of a part of the rear projection screen in which the invention is used, FIGS. 3 and 4 illustrate further embodiments of the rear projection screen according to the invention, and FIG. 5 illustrates a number of steps which can be advantageously used in a rear projection screen according to the invention.

FIG. 1 is a diagrammatic horizontal cross-section of a rear projection screen for the display of a color video programme which system has a known rear projection screen. The mutual dimensions of the various elements are not drawn to scale. In this FIGURE the reference numerals 11, 12 and 13 denote three primary image sources, for example cathode ray tubes which generate the red, green or blue component of a colour video image on their respective windows 14, 15 and 16. The image components thus formed are projected onto the projection screen 30 by the systems of projection lenses 21, 22 and 23 diagrammatically shown as single lenses in the FIGURE. The screen shown comprises two plates. The rear plate 31 has a Fresnel structure so that the pupils of the projection lens systems are imaged in the audience room. The front plate 40 has elements 41 on its front side, which elements spread the light in the plane of the drawing, i.e. the horizontal plane. These elements extend throughout the height of the screen at right angles to the plane of the drawing. The elements whose tips have an indentation have very good properties relating to the horizontal light-spreading and the colour shift in that plane. Such a structure in which the height D is at least equal to half the width B is described in the European Patent Application No. 0,148,529 laid open to public inspection.

The light spread perpendicular to the plane of the drawing, i.e. in the vertical direction, in the screen shown is the result of a large number of transparent grains 42 incorporated for that purpose in the front plate, which grains have a refractive index which is different from the refractive index of the plate material. A roughened surface on the rear side of the plane may serve for the same purpose.

A plate having a roughened surface or being provided with light-dispersing properties in another manner has the drawback of a decreasing resolving power of the screen. This drawback is considerably reduced in the projection screen according to the invention. In FIG. 2 part of a plate according to the invention for a rear projection screen is shown in a vertical cross-section. One of the elements present on the front side of the plate for spreading light in the horizontal direction is again denoted by the reference numeral 41. Second light-spreading elements 43 which refract the light incident thereon in the vertical direction are provided on the rear side of the plate. The ratios shown of the radii of curvature and the width are associated with a plate which is eminently suitable for use in a projection television system or a video monitor. The angle α between the normal on the surface of an element and the normal on the plane of the plate is approximately 22° and consequently the angle β which is enclosed between the surfaces of two juxtaposed elements is approximately 136°. If the screen is manufactured of a material having a refractive index of approximately 1.5, such as PMMA, this results in co-operation with the front side which is not curved in the vertical direction, in a vertical viewing angle of approximately 22°. The width p of an element is, for example 200 μm. This value is approximately equal to the resolving power of the human eye and at a screen height of approximately one meter it is considerably smaller than the detail size of a video image projected thereon, which comprises a number of lines of the order of 1000.

FIG. 3 shows a further embodiment of the plate, likewise in a vertical cross-section. Unlike FIG. 2 in which the light-spreading elements on the outside were convex, the light-spreading elements 43 are concave on the outside. The values of the angles α and β and of the width p may be equal to those of the plate shown in FIG. 2 when this plate is used in a projection television system.

FIG. 4 shows a third embodiment of the plate in a vertical cross-section. The light-dispersing elements 43 are alternately convex and concave and pass into one another. The widths $p_1$ and $p_2$ of the convex and concave elements may be equal or unequal, respectively.

With reference to the embodiment of FIGS. 2, 5 shows some steps which can be taken in connection with the invention. In the material of the screen a small quantity of light-dispersing grains may be provided, for example at most one third of the quantity in the known screen. This "bulk diffusor" results in too abrupt intensity variations, for example due to inaccuracies in the shape of the light-spreading elements 41 and 43, being attenuated so that an intensity distribution is obtained which is pleasant to the eye.

Secondly the rear side may be made anti-reflective. This can be realized, for example by providing a conventional single or multilayer anti-reflective coating on the rear side, but also by providing the rear side with a fine roughening and providing a layer of consant thickness thereon as described in European Patent Application No. 0,131,341. It is alternatively possible to provide the rear side with a microrelief structure which is commonly referred to as "moth's eye structure" and is described, for example in the magazine "Optica Acta", Vol. 29, No. 7, pages 993-1009.

When using the plate according to the invention in a rear projection system, the resolving power is improved considerably. The way in which this improvement results in an improvement of the resolving power in the horizontal and vertical directions depends on the position of the image of the primary image source formed by the projection lens system with respect to the front and rear sides of the plate. A factor 2 in the horizontal direction and simultaneously a factor 4/3 in the vertical direction has been found to be attainable in practice.

What is claimed is:

1. A rear projection screen having a front and a rear side for displaying on the front side of the screen an image supplied by at least one primary image source placed on the rear side of the screen, said screen comprising a light-transparent plate having on its front side a multiple of parallel-arranged first light-spreading elements extending in a first direction across the plate for spreading light in a first plane perpendicular to the first direction, said elements having steep edges for obtaining total internal reflection and a tip having a portion for transmission and refraction, characterized in that the rear side of the plate has parallel-arranged second light-spreading elements extending in a second direction substantially perpendicular to the first direction for spreading light in a second plane perpendicular to the second direction.

2. A rear projection screen as claimed in claim 1, characterized in that light, which is substantially perpendicularly incident on the rear side of the screen, is refracted through an angle of between 5° and 20° at a maximum by the second light-spreading elements, in co-operation with the first light-spreading elements which are not curved in the vertical direction.

3. A rear projection screen as claimed in claim 1, characterized in that the maximum angle between the surface of the second light-spreading elements and the plane of the plate has a value of between approximately 10° and approximately 40°.

4. A rear projection screen as claimed in claim 1, characterized in that the second light-spreading elements are convex elements.

5. A rear projection screen as claimed in claim 1, characterized in that the second light-spreading elements are concave elements.

6. A rear projection screen as claimed in claim 1, characterized in that a number of the second light-spreading elements is convex and a number is concave.

7. A rear projection screen as claimed in claim 6, characterized in that the convex and concave second light-spreading elements alternate with one another.

8. A rear projection screen as claimed in claim 1, characterized in that the cross-sections of the second light-spreading elements substantially have the shape of a segment of a circle.

9. A rear projection screen as claimed in claim 8, characterized in that a segment of a circle constitutes an arc of approximately 44°.

10. A rear projection screen as claimed in claim 1, characterized in that a diffusor is provided in the plate.

11. A rear projection screen as claimed in claim 1, characterized in that the rear side of the plate is anti-reflective.

12. A rear projection screen as claimed in claim 1, characterized in that the number of second light-spreading elements is at least 2000.

13. A rear projection system, comprising
  a primary image source furnishing an image;
  a system of lenses for projecting said image onto a screen; and
  a rear projection screen having a rear side for receiving said image and a front side for displaying said image, said screen comprising a light transparent plate having on said front side a multiple of parallel first light spreading elements extending in a first direction across the plate for spreading light in a first plane perpendicular to said first direction, said elements having steep edges for obtaining total internal reflection and a tip having a flatter portion for transmission and refraction, characterized in that said rear side of said plate has second light-spreading elements extending in a second direction substantially perpendicular to said first direction for spreading light in a second plane perpendicular to said second direction.

* * * * *